United States Patent
Liu et al.

(10) Patent No.: US 9,558,766 B1
(45) Date of Patent: Jan. 31, 2017

(54) CONTROLLING SPACING BETWEEN A READ TRANSDUCER AND A RECORDING MEDIUM USING A WRITE COIL

(71) Applicant: Seagate Technology LLC, Cupertino, CA (US)

(72) Inventors: Xiong Liu, Singapore (SG); Lihong Zhang, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/865,133

(22) Filed: Sep. 25, 2015

(51) Int. Cl.
G11B 5/127 (2006.01)
G11B 5/31 (2006.01)
G11B 5/00 (2006.01)

(52) U.S. Cl.
CPC ....... G11B 5/314 (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,366,428 B1 * | 4/2002 | Yamanaka | ............. | B82Y 10/00 360/123.27 |
| 7,352,525 B1 * | 4/2008 | Shrestha | ............. | G11B 5/6005 360/75 |
| 7,532,434 B1 * | 5/2009 | Schreck | ............. | G11B 5/3116 360/125.3 |
| 8,526,274 B2 * | 9/2013 | Naniwa | ............. | G11B 5/3106 360/59 |
| 8,588,040 B1 * | 11/2013 | Fujita | ............. | G11B 5/102 360/59 |
| 8,867,323 B2 * | 10/2014 | Andruet | ............. | G11B 17/32 369/112.27 |
| 9,025,420 B1 * | 5/2015 | Ito | ............. | G11B 5/02 360/59 |
| 2002/0105758 A1 * | 8/2002 | Chiba | ............. | G11B 5/102 360/235.4 |
| 2002/0155794 A1 * | 10/2002 | Fatula, Jr. | ............. | B24B 37/048 451/53 |
| 2004/0075940 A1 * | 4/2004 | Bajorek | ............. | G11B 5/10 360/110 |
| 2006/0221498 A1 * | 10/2006 | Bonhote | ............. | G11B 5/3106 360/125.31 |
| 2008/0023468 A1 * | 1/2008 | Aoki | ............. | B82Y 10/00 219/655 |
| 2009/0073597 A1 * | 3/2009 | Shiramatsu | ............. | G11B 5/3133 360/59 |

(Continued)

*Primary Examiner* — Carlos E Garcia
(74) *Attorney, Agent, or Firm* — Hollingsworth Davis, LLC

(57) ABSTRACT

While a heat-assisted, magnetic recording medium is being read from, power is applied to a write coil of a read/write head to control a spacing between a read transducer and the recording medium via thermal expansion induced by a write pole magnetically coupled to the write coil. A coefficient of thermal expansion proximate the read transducer is higher than a coefficient of thermal expansion proximate the write pole to increase a deformation at the read transducer relative to the write pole. Optionally, a media-facing surface of the read/write head may include a recess encompassing at least the write pole to prevent contact between the write pole and the recording medium while controlling the spacing.

20 Claims, 5 Drawing Sheets

(56) References Cited

U.S. PATENT DOCUMENTS

| | | | |
|---|---|---|---|
| 2009/0103208 A1* | 4/2009 | Aoki | G11B 5/3133 360/110 |
| 2009/0262608 A1* | 10/2009 | Kurita | G11B 5/314 369/13.33 |
| 2010/0002330 A1* | 1/2010 | Lille | G11B 5/314 360/59 |
| 2010/0321816 A1* | 12/2010 | Saito | G11B 5/3133 360/59 |
| 2011/0013308 A1* | 1/2011 | Brand | G11B 5/3136 360/59 |
| 2015/0162040 A1 | 6/2015 | Rea et al. | |

* cited by examiner

CONTROLLING SPACING BETWEEN A READ TRANSDUCER AND A RECORDING MEDIUM USING A WRITE COIL

SUMMARY

The present disclosure is directed to controlling spacing between a read transducer and a recording medium using a write coil. In one embodiment, while a heat-assisted, magnetic recording medium is being read from, power is applied to a write coil of a read/write head to control a spacing between a read transducer of the read/write head and the recording medium via thermal expansion induced by a write pole magnetically coupled to the write coil. A coefficient of thermal expansion proximate the read transducer is higher than a coefficient of thermal expansion proximate the write pole to increase a deformation at the read transducer relative to the write pole.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
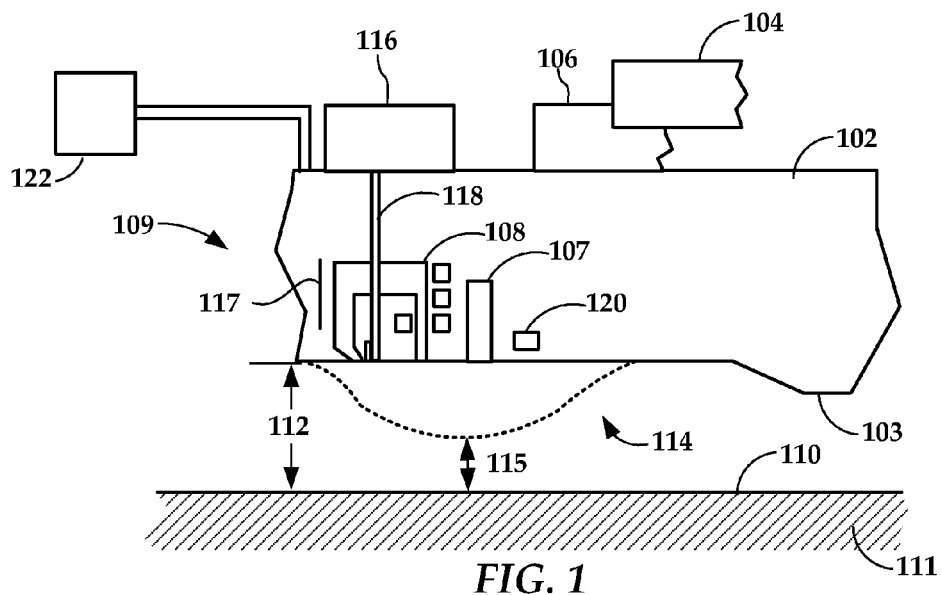
FIG. 1 is a block diagram of a hard drive slider and media arrangement according to an example embodiment.

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write pole to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be coupled to a HAMR read/write head either directly (e.g., surface-attached) or indirectly (e.g., via optical fiber). An optical path (e.g., waveguide) may be integrated into the read/write head to deliver the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction-limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

The high concentration of energy near the NFT can result in significant localized heating at the NFT and surrounding regions. Other components also contribute to this heating, including the write pole and heaters used to control spacing between the read/write head and the recording medium. This distance or spacing is sometimes known as "flying height" or "head-media spacing" (HMS). Generally, the spacing is controlled by application of a current to one or more heaters near the read and/or write transducers. This causes local thermal expansion and causes the transducer(s) to protrude from a surface of the read/write head.

While heaters can be effective to control HMS during reading and writing, they require resources that are limited on a HAMR read/write head. For example, the additional components used in a HAMR read/write head (e.g., laser, photodetectors, etc.) compared to a conventional head (e.g., perpendicular recording head) require additional electrical leads to be coupled to a microscopic slider assembly which already includes leads for read transducer, write pole, at least one heater, and possibly other components (e.g., sensors). Adding these leads can lower yields of the manufactured head assemblies, increase electrical impedance due to narrowed trace width, increase temperature at the lead junctions, etc.

In embodiments described below, a HAMR read/write head uses the write element (e.g., write coil and write pole) as a heater during read operations to maintain the desired HMS. Because of the high magnetic coercivity of the HAMR recording medium, energizing the write pole will not erase data of the recording medium so long as the laser is not turned on. Thus, fly height control during read operations can be achieved using calibrated write current profiles in HAMR hard disk drives.

In reference now to FIG. 1, a block diagram shows a side view of a hard drive slider apparatus 102 according to an example embodiment. The slider 102 is coupled to an arm 104 by way of a suspension including a gimbal assembly 106 that allows some relative motion between the slider 102 and arm 104. The slider 102 includes one or more read transducers 107 and one or more write transducers 108 at a trailing edge 109 that are held proximate to a surface 110 of a magnetic recording medium, e.g., magnetic disk 111. When the slider 102 is located over surface 110 of the disk 111, a passive flying height 112 is maintained between the slider 102 and the surface 110 by a downward force of arm 104. This downward force is counterbalanced by an air cushion that exists between the media surface 110 and an air bearing surface 103 of the slider 102 when the disk 111 is rotating.

It is desirable to maintain a predetermined slider flying height over a range of disk rotational speeds during both reading and writing operations to ensure consistent performance. A region 114 is a "close point" of the slider 102, which is generally understood to be the closest point of contact between the slider 102 and the magnetic recording medium 111. To account for both static and dynamic variations that may affect slider flying height 112, the slider 102 may be configured such that a region 114 of the slider 102 can be configurably adjusted during operation to affect a dynamic fly height 115 during reading and/or writing. This is shown in FIG. 1 by dotted line that represents a change in geometry of the region 114.

In this example, the geometry change may be induced, in whole or in part, by an increase or decrease in temperature of the region 114. Changes in temperature causes a deformation in this area 114 due to thermal expansion of the surrounding materials. Thus, selective application of heat to the slider 102 can be used to finely adjust the fly height of the transducers 107, 108 during reading and writing, e.g., as measured between the transducers 107, 108 and media surface 110.

To provide this type of control over head-media spacing 115, the slider 102 may include (or otherwise be thermally coupled to) a heating element 117. This heating element (e.g., a resistance heater) may be provided with selectable amounts of current to control the head-media spacing 115 through heat-induced expansion of the physical structure. Other elements of the slider 102 may also provide heat besides or in addition to the heating element. For example, a write coil of the read/write transducer 108 may generate sufficient heat to cause configurable deformation of region 114. This is sometimes referred to as "writer protrusion" or "write-current-induced protrusion" and may need to be accounted for when the write coil is active, e.g., when writing is occurring.

The slider 102 may include a resistive temperature sensor 120 located at or proximate to region 114. This sensor 120 has a temperature coefficient of resistance (TCR) that enables high precision measurements of temperature (or temperature change) at the region 114, and so is sometimes referred to as a TCR sensor. The TCR sensor 120 is coupled to control circuitry 122. The control circuitry 122 communicates with the sensor 120, as well as other electrical components of the slider 102. Two or more TCR sensors 120 may be employed, e.g., disposed in physically separate locations from each other. Multiple sensors 120 be wired separately from each other, or together (e.g., in series or parallel) to reduce the number of connections needed for the slider 102.

In this particular example, the disk 111 is a heat-assisted magnetic HAMR medium, and so is locally heated while being written to by the write portion of transducer 108. An energy source such as a laser 116 provides the energy to create these hot spots. The laser 116 may be built into or attached to the slider 102, which includes an optical pathway 118 (e.g., waveguide) configured to direct and focus this energy onto a hotspot of the medium 111.

The laser 116 of the HAMR slider 102 creates a hotspot on the media surface 110, which locally reduces magnetic coercivity such that the write pole's magnetic field can change the magnetic orientation within the hotspot. If the magnetic field extends significantly outside the hotspot region, the unheated regions will not be magnetically changed due to the higher coercivity of those unheated regions. Thus, the HAMR slider 102 can write bits that are no larger than the hotspot, even if the magnetic field extends over a much larger area.

The high coercivity of the unheated HAMR medium 111 means that the write coil of transducer 108 can operate without affecting the medium 111 as long as the laser 116 (or other media-heating source) is not heating the medium 111 (e.g., turned off, redirected) causing the heat to be removed from the surface 110. As noted above heat generated by the writer allows the writer to be used to adjust head-media spacing 115 while reading data without a dedicated read heater. While a heater may still be included for other purposes (e.g., adjusting dynamic write fly height during recording), the slider 102 does not need to include a heater dedicated to adjusting fly height of the read portion of transducer 108. This can result in minimizing the number of electrical connections required for the slider 102.

Figure 2:
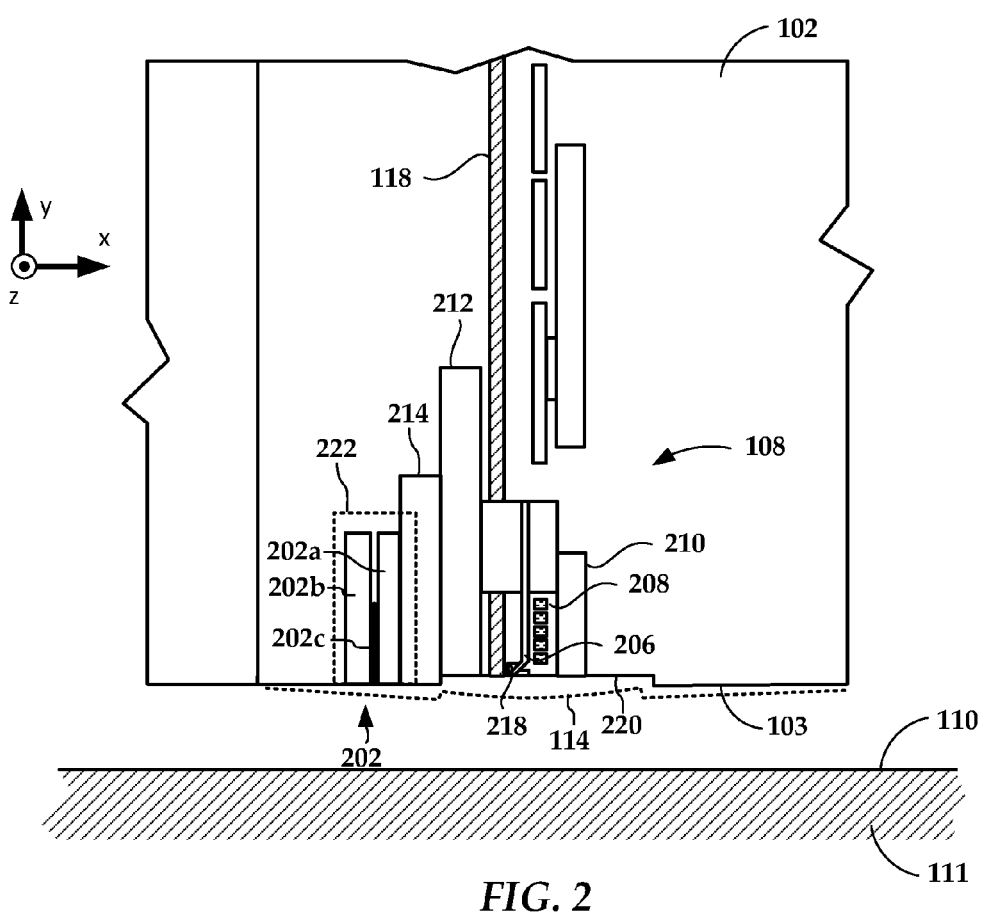
FIGS. 2-4 are cross-sectional views of a read/write head according to example embodiments.

The components of the slider 102 are shown in greater detail in FIG. 2, which is a block diagram illustrating a cross-sectional view of the read/write transducers 108 of the read/write head 102 according to an example embodiment. This diagram shows a portion of slider 102 near the close-point region 114. In this view, the x-direction is down-track relative to the media, and the z-direction (normal to the plane of the page) is the cross-track direction. A read sensor 202 is located near the ABS 103. The read sensor may include first and second shields 202$a$-$b$ and a magnetoresistive stack 202$c$.

A write pole 206 may include a ferromagnetic structure that extends to the ABS 103. A write coil 208 is energized to generate a magnetic field within the write pole 206, the field extending to the media surface 110. The slider 102 may be configured for perpendicular recording, wherein the magnetic orientation is perpendicular (oriented along the y-direction in this view) to the media surface 110. Accordingly, the slider may include one or more return poles 210, 212 that facilitate, along with a particular arrangement of layers in the medium 111, perpendicular orientation of the magnetic fields of the recorded data.

To facilitate heating the HAMR medium 111 during recording, the slider 102 includes a waveguide 118 that extends towards the ABS 103. The waveguide 118 delivers light to a near-field transducer (NFT) 218 that is located at the ABS 103 proximate a tip of the write pole 206. Light coupled to the NFT 218 causes it to achieve surface plasmon resonance, thereby directing a beam of electromagnetic energy to the media surface 110 during write operations. The energy creates a small hotspot on the media surface 110 with lowered magnetic coercivity, enabling a magnetic field generated from the write pole 206 to affect magnetic orientation within the hotspot.

In some configurations, the slider 102 may include a heater (not shown) to adjust the head-to-media spacing of the write pole 206 during write operations. However, in this example, the slider does not include a separate heater for the reader 202. Instead, the write coil 208 can be activated to provide the heat that might normally be provided by that separate heater. Any magnetic fields generated by this activation of the coil 208 will not change data on the medium 111 so long as the light source is not activated to heat the media surface 110. The write pole 206 may be activated by itself to control HMS during reading, or together with a write heater. During writing, only the write heater would be used for HMS control, as the write pole 206 will be writing data to the medium 111 in response to a write signal.

In order to prevent the write pole 206 and other nearby components from touching the media surface 110 while heating during read operations, the media-facing surface 103 includes a recess 220 near the write pole 218. The recess 220 encompasses at least the write pole 218, and may also encompass one or both of the return poles 210, 212 as shown here. The recess 220 may be parallel to the media-facing surface 103, as shown here. In other configurations, the recess 220 may be slanted, cupped, etc., to achieve a particular protrusion profile during both reading and writing. It should be noted that, because the write pole 218 will experience at least some amount of writer protrusion during writing, it should be possible even with the recess 220 to achieve a target write clearance and prevent the writer from touching the media surface 110 while the writer coil is heated to protrude the reader while reading data from recording medium 111. Laser-induced protrusion will also exist when writing, and this will cause additional protrusion from the recess 220 that would not occur during reading.

Recess 220 is a safeguard to prevent writer from touching the disk during both laser-assisted writing and write-current-assisted reading.

Protrusion caused by the laser and write current while writing will be dictated by the data being written, and so as noted above, independent control of write protrusion may be provided by a write heater (not shown). The write heater can be located away from the reader 202 (e.g., to the right of the return pole 210 in the figure) to minimize protrusion near the reader 202 during writing.

In order to increase relative protrusion of the reader 202 in response to heating of the writer while reading, the reader 202 may be surrounded by a material 222 having higher coefficient of thermal expansion (CTE) than other nearby materials. In addition, region 214 between the reader and writer may be formed on a high CTE material. The region 214 may also or instead be formed of a material of high thermal conductivity so as to more effectively conduct heat from the writer to the reader 202.

Other features may also be included to prevent contact by either the reader 202 or the write pole 206 during read and write operations. For example a region 214 located downtrack between the reader and the writer may extend from the media-facing surface 103 either as manufactured and/or due to thermal expansion. This causes the region 214 to contact the media surface 110 instead of the reader 202 or write pole 206. The region 214 may include a mechanically robust material at least facing outwards from the surface 110 to ensure it can endure repeated contact with the medium 111.

Figure 3:
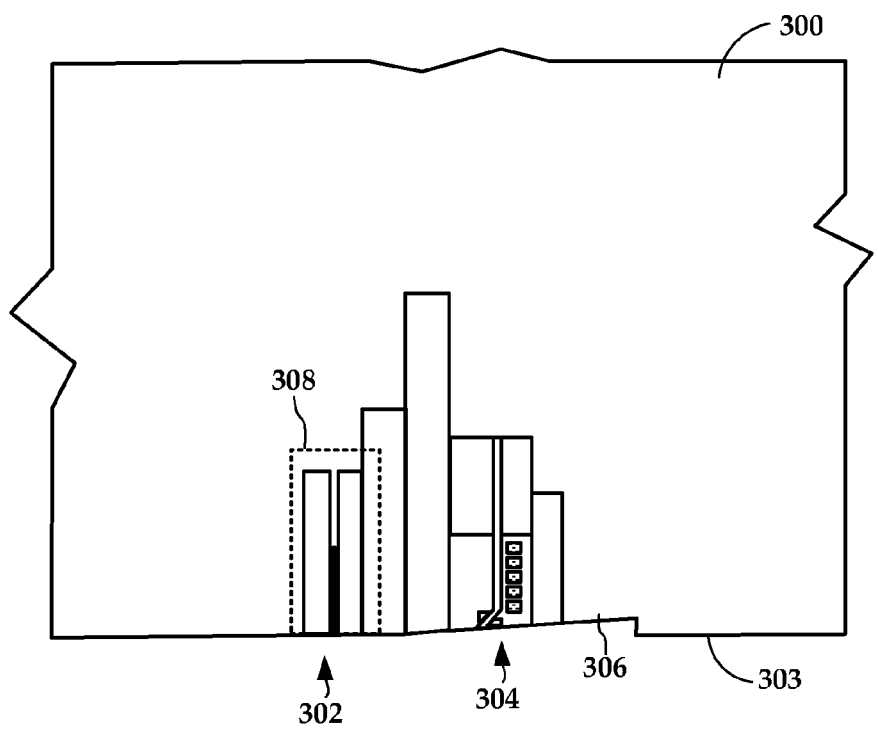

In FIG. 3, a cross-sectional view of a slider 300 shows a recess 306 according to another example embodiment. The recess 306 encompasses a writer 304, which is located in a downtrack direction from a reader 302. The features of this slider 300 may be otherwise similar to that described in FIG. 2, except that the recess 306 in this example is slanted relative to a media-facing surface 303. A high CTE material 308 may also surround at least part of the reader 302 to assist in controlling protrusion of the reader 302 during reading solely due to heating from the writer 304 (e.g., write coil and write pole).

Figure 4:
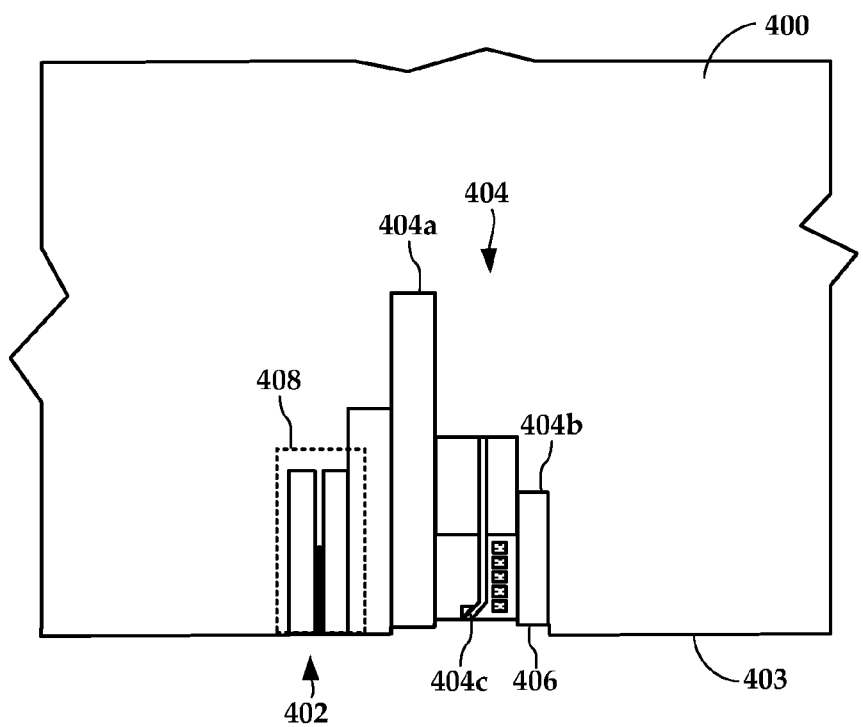

In FIG. 4, a cross-sectional view of a slider 400 shows a recess 406 according to another example embodiment. The recess 406 encompasses a writer 404, which is located in a downtrack direction from a reader 402. The features of this slider 400 may be otherwise similar to that described in FIG. 2, except that the recess 406 in this example is stepped. A first recess depth is formed at ends of return poles 404a-b, and a second recess depth encompasses a write pole 404c. The stepped parts of the recess may be parallel to a media-facing surface 403 as shown, or slanted. A high CTE material 408 may also surround at least part of the reader 402 to assist in controlling protrusion of the reader 402 during writing solely by heating from the writer 404 (e.g., write coil and write pole).

Figure 5:
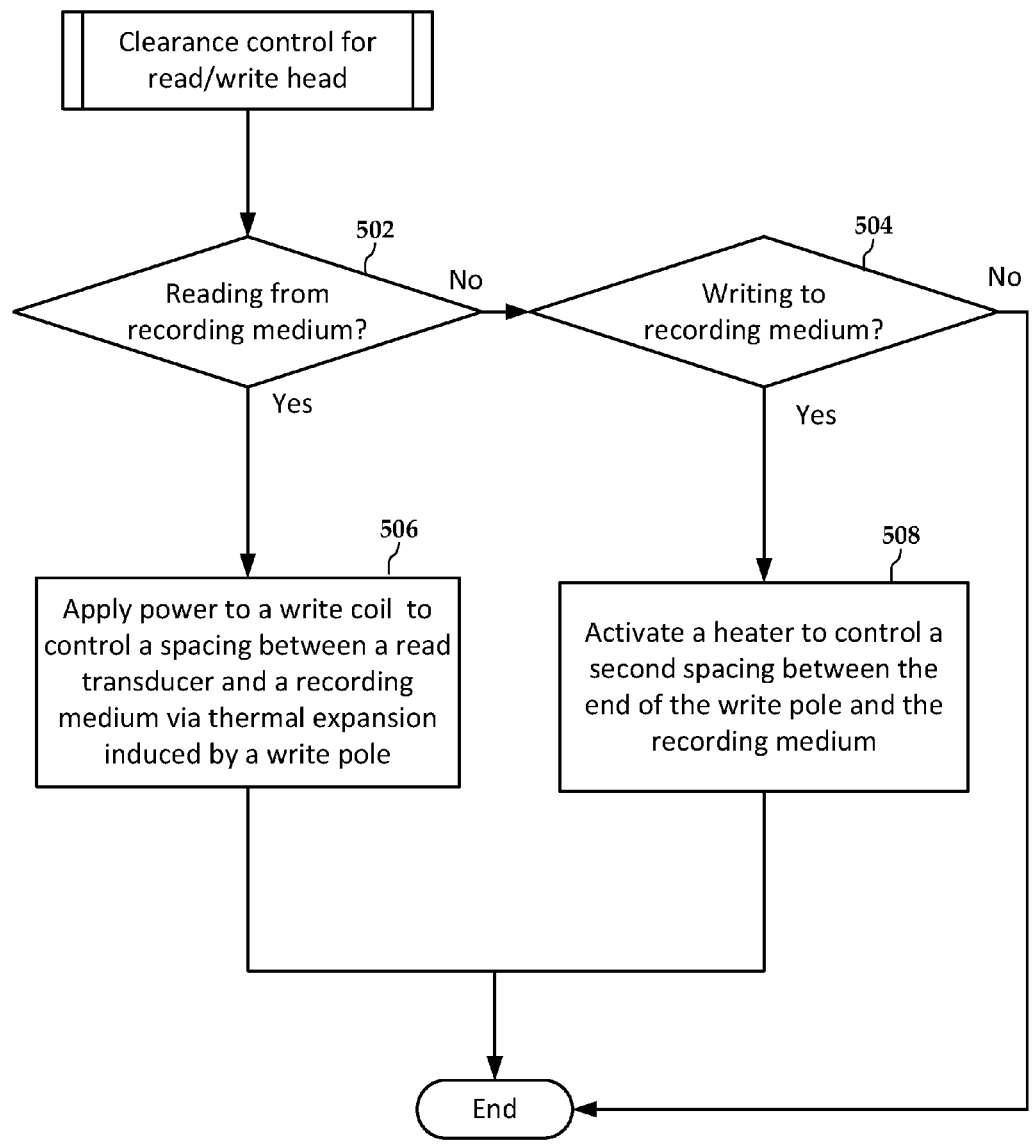
FIG. 5 is a flowchart illustrating a method according to an example embodiment.

In FIG. 5, a flowchart illustrates a method for providing clearance control for a read/write head according to an example embodiment. As represented by blocks 502 and 504, a determination is made whether the read/write head is currently reading from or writing to a heat-assisted recording medium. While the recording medium is being read from, power is applied 506 to a write coil of a read/write head to control a spacing between a read transducer of the read/write head and the recording medium. The spacing is controlled via thermal expansion induced by a write pole magnetically coupled to the write coil.

A second heat source (e.g., a heater used for dedicated HMS control during writing) may also contribute to thermal expansion during reading. A coefficient of thermal expansion proximate the read transducer is higher than a coefficient of thermal expansion proximate the write pole to increase a deformation at the read transducer relative to the write pole. While the recording medium is being written to, the dedicated heater is activated 508 to control a second spacing between the end of the write pole and the recording medium.

Figure 6:
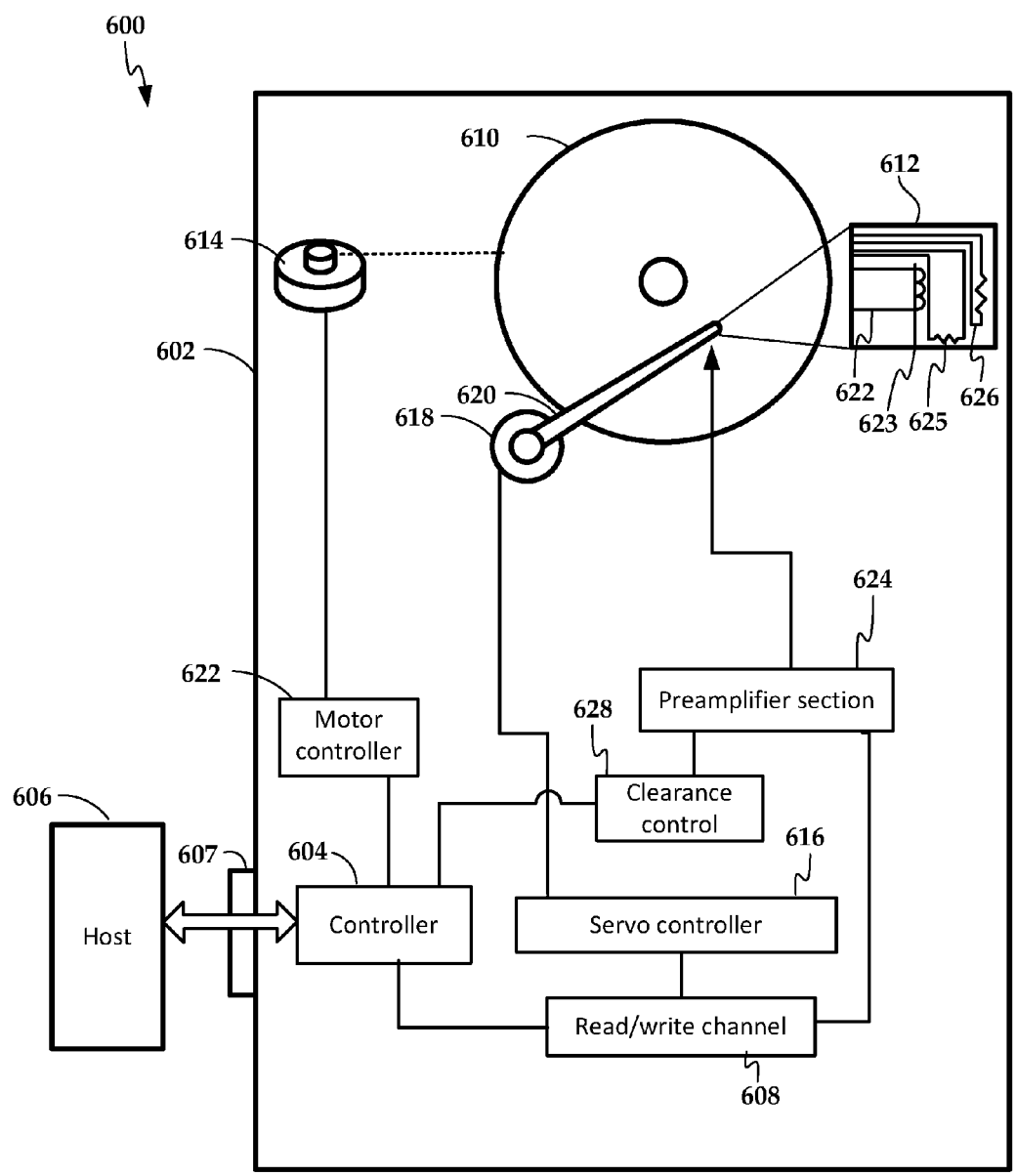
FIG. 6 is a block diagram of a system and apparatus according to an example embodiment.

In reference now to FIG. 6, a block diagram illustrates components of a system 600 according to an example embodiment. The system 600 includes a HAMR hard drive 602 with one or more read/write heads 612. The hard drive 602 includes circuitry such as a controller 604 that controls a number of functions of the system 600. For example, the controller 604 may provide communications between the hard drive 602 and a host device 606 via a host interface 607. The host device 606 may include any electronic device that can be communicatively coupled to communicate with the hard drive 602, e.g., a general-purpose computer, a factory test bench, remote terminal, etc.

The controller 604 may include any combination of custom logic circuits, application specific integrated circuits (ASICs), general-purpose central processing unit (CPU), interface circuits, and may utilize instructions stored as firmware and/or software. The controller 604 may read data from and write data to a recording medium (e.g., disk 610) via a read/write channel 608. The controller 604 may, among other things, determine a location on the disk 610 for the desired data, move the heads to the location (track) of the data, read or write the data via the read/write channel 608, correct errors, transfer the data to/from the host 606, etc.

The read/write channel 608 converts data between the digital signals processed by the data controller 604 and the analog signals conducted through read/write heads 612. The read/write channel 608 also provides servo data read from the disk 610 to a servo controller 616. The servo controller 616 uses these signals to drive an actuator 618 (e.g., voice coil motor) that rotates an arm 620, upon which the read/write heads 612 are mounted. The heads 612 are moved radially across different tracks of the disk(s) 610 by the actuator motor 618 (e.g., voice coil motor), while a spindle motor 614 rotates the disk(s) 610. A microactuator (not shown) may also be included to provide finer tracking control, and also receives inputs from the servo controller 616. The controller 604 controls the spindle motor 614 by way of a motor controller 622.

During write operations, the read/write channel 608 provides analog signals that are delivered to a write coil the read/write heads 612 by way of a preamplifier section 624. The preamplifier section 624 amplifies and conditions the write signals sent to write coils 622 of the read/write heads 612. The preamplifier 624 also includes circuitry that activates a laser (or other energy source) at each of the read/write heads 612 during write operations. The preamplifier also provides power to activate a clearance control heater 626 (e.g., resistive heater) during write operations.

The preamplifier section 624 also receives signals from the read/write head 612 and conditions the signals for at least the read/write channel 608. Data is read via a read transducer 625, which may be configured as a magnetoresistive sensor. Other signals may also be generated via sensors of the read/write head 612, such as temperature sensors, photodetectors, etc. During read operations, clearance control is provided solely by the write coil 622, or the write coil 622 in combination with the heater 626. Energizing the write coil 622 heats the surrounding area, and heat is also conducted along a write pole 623 that terminates at a media-facing surface of the read/write head.

Generally, clearance control during reads and writes is governed via a clearance control component 628. During read operations, HMS control can be achieved by using calibrated write profiles. Current is applied to the write coil 622 to achieve a target clearance. Because the time constant of the write coil 622 and other components may be different from that of other heat sources commonly used (e.g., a resistive heater), the write profiles may be adapted, e.g., to apply a higher write current than would be used during writing to ensure clearance can be achieved in the desired amount of time. Further, the heat signal applied to the write coil 622 may use direct current (DC) instead of an alternating current waveform as used in writing. In some configurations, this DC current may be modulated, e.g., having a time-varying amplitude at a selected frequency, but with current flowing in only one direction.

Figure 7:
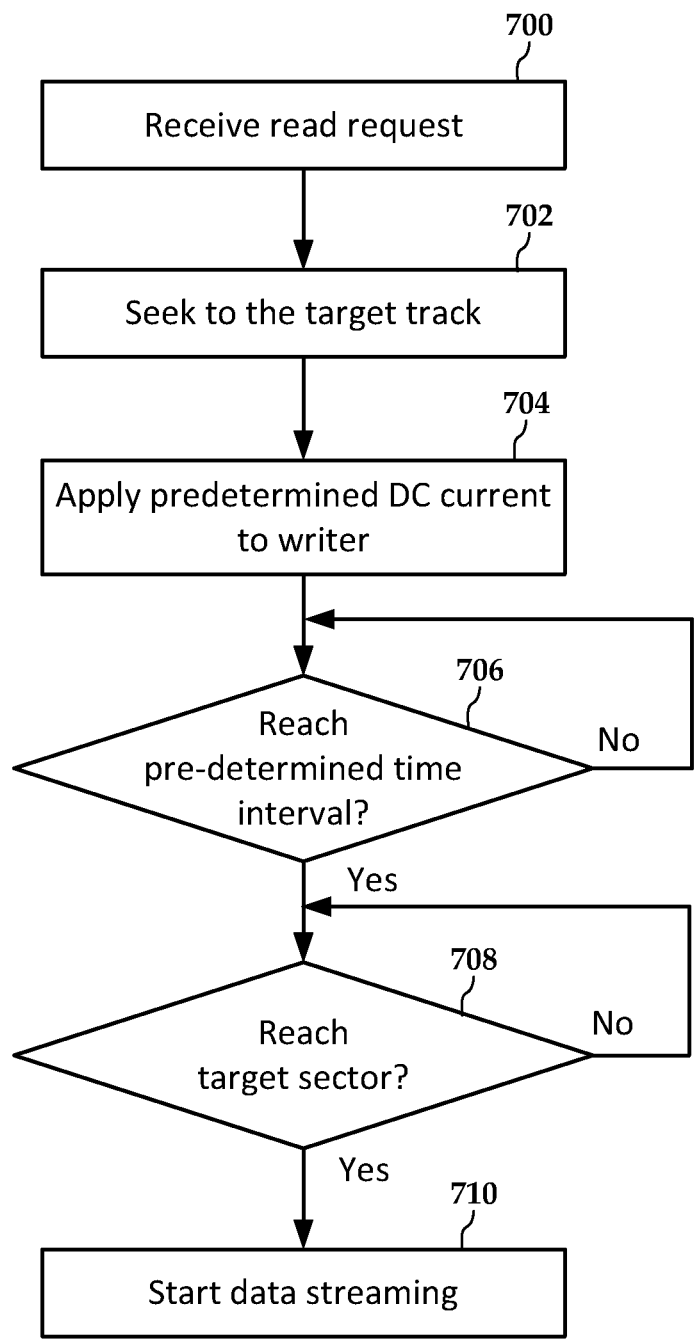
FIG. 7 is a flowchart illustrating a method according to an example embodiment.

In FIG. 7, a flowchart illustrates a procedure that may be utilized by a clearance control component according to an example embodiment. A read request is received 700, resulting in a servo system seeking 702 to a target track. As the seek 702 begins, a predetermined DC current is also applied 704 to the writer (e.g., write coil). Block 706 represents a wait state the holds until a predetermined time interval is reached. This may also wait on some other variable, e.g., the output of a temperature sensor that is used to estimate HMS, a predetermined number of servo sectors before read is to begin.

A second wait state is indicated by block 708, which waits until the target sector is reached. After the target sector is reached, data streaming from the read transducer can start 710, to be processed by a read channel as is known in the art. During the data streaming, the value of current applied to the writer can be varied due to known asperities, zone locations on media, and/or to measured data (e.g., temperature measurements, variable gain amplifier settings) to maintain clearance while reading.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
 while a heat-assisted, magnetic recording medium is being read from, applying power to a write coil of a read/write head to control a spacing between a read transducer of the read/write head and the recording medium via thermal expansion induced by a write pole magnetically coupled to the write coil, a coefficient of thermal expansion proximate the read transducer being higher than a coefficient of thermal expansion proximate the write pole to increase a deformation at the read transducer relative to the write pole.

2. The method of claim 1, wherein an end of the write pole is recessed from a media facing surface of the read/write head such that the write pole is further away from the media-facing surface than the read transducer, the recession preventing contact between the write pole and the recording medium while controlling the spacing.

3. The method of claim 2, further comprising, while the heat-assisted, magnetic recording medium is being written to, activating a heater of the read/write head to control a second spacing between the end of the write pole and the recording medium.

4. The method of claim 2, wherein an end of at least one return pole is recessed from the media-facing surface.

5. The method of claim 1, wherein the write pole and write coil are the sole source of heat controlling the spacing of the read transducer via the thermal expansion.

6. The method of claim 1, wherein applying the power to the write coil comprises applying a direct current signal.

7. A read/write head comprising:
 a read transducer; and
 a write transducer comprising a write pole magnetically coupled to a write coil, wherein power applied to the write coil during reading of a heat-assisted, magnetic recording medium via the read transducer controls a spacing between the read transducer and the heat-assisted, magnetic recording medium via thermal deformation, a coefficient of thermal expansion proximate the read transducer being higher than a coefficient of thermal expansion proximate the write pole to increase a deformation at the read transducer relative to the write pole.

8. The read/write head of claim 7, further comprising a recess in a media-facing surface, the recess encompassing at least the write pole such that the write pole is further away from the media-facing surface than the read transducer, the recess preventing contact between the write pole and the recording medium while controlling the spacing.

9. The read/write head of claim 8, further comprising a heater that is activated while the heat-assisted, magnetic recording medium is being written to, the activation controlling a second spacing between the end of the write pole and the recording medium.

10. The read/write head of claim 8, the write transducer further comprising at leak one return pole, the recess further encompassing the at least one return pole.

11. The read/write head of claim 8, wherein the recess is slanted relative to the media-facing surface.

12. The read/write head of claim 8, wherein the recess comprises a stepped recess.

13. The read/write head of claim 7, wherein the write pole and write coil are the sole source of heat controlling the spacing of the read transducer via the thermal expansion.

14. The read/write head of claim 7, wherein applying the power to the write coil comprises applying a direct current signal.

15. An apparatus comprising:
- a preamplifier section configured to apply power to a write coil of a read/write head; and
- a controller coupled to the preamplifier section and configured to, while a heat-assisted, magnetic recording medium of the apparatus is being read from:
  - apply power to the write coil to control a spacing between a read transducer of the read/write head and the recording medium via thermal expansion induced by a write pole magnetically coupled to the write coil, a coefficient of thermal expansion proximate the read transducer being higher than a coefficient of thermal expansion proximate the write pole to increase a deformation at the read transducer relative to the write pole.

16. The apparatus of claim 15, wherein an end of the write pole is recessed from a media facing surface of the read/write head to prevent contact between the write pole and the recording medium while controlling the spacing.

17. The apparatus of claim 16, wherein the controller is further configured to, while the heat-assisted, magnetic recording medium is being written to, activate a heater of the read/write head to control a second spacing between the end of the write pole and the recording medium.

18. The apparatus of claim 16, wherein an end of at least one return pole is recessed from the media-facing surface such that the write pole is further away from the media-facing surface than the read transducer.

19. The apparatus of claim 15, wherein the write pole and write coil are the sole source of heat controlling the spacing of the read transducer via the thermal expansion.

20. The apparatus of claim 15, wherein applying the power to the write coil comprises applying a direct current signal.

* * * * *